United States Patent
Hansknecht

(10) Patent No.: US 10,270,860 B2
(45) Date of Patent: Apr. 23, 2019

(54) INCREASED INTEROPERABILITY BETWEEN WEB-BASED APPLICATIONS AND HARDWARE FUNCTIONS

(71) Applicant: International Business Machines Corporation, Armonk, NY (US)

(72) Inventor: Douglas J. Hansknecht, Columbus, OH (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/602,338

(22) Filed: May 23, 2017

(65) Prior Publication Data
US 2017/0257438 A1  Sep. 7, 2017

Related U.S. Application Data

(63) Continuation of application No. 14/729,349, filed on Jun. 3, 2015, now Pat. No. 9,716,759, which is a
(Continued)

(51) Int. Cl.
*H04L 29/08* (2006.01)
*G06F 17/30* (2006.01)

(52) U.S. Cl.
CPC ...... *H04L 67/125* (2013.01); *G06F 17/30899* (2013.01); *H04L 67/02* (2013.01); *H04L 67/10* (2013.01)

(58) Field of Classification Search
CPC .................................................... H04L 67/125
(Continued)

(56) References Cited

U.S. PATENT DOCUMENTS 6,791,579 B2 * 9/2004 Markel ................. H04N 7/088
 348/E5.006
6,816,880 B1 * 11/2004 Strandberg .............. H04L 29/06
 709/202

(Continued)

FOREIGN PATENT DOCUMENTS

| EP | 1349061 A1 | 10/2003 |
| EP | 2270658 A1 | 1/2011 |
| WO | 2008054951 A1 | 5/2008 |

OTHER PUBLICATIONS

Biggs et al., "Native robot software framework inter-operation", 2010, pp. 180-191.*

(Continued)

*Primary Examiner* — Ondrej C Vostal
(74) *Attorney, Agent, or Firm* — Jay Wahlquist; Maxine L. Barasch; Keohane & D'Alessandro PLLC

(57) ABSTRACT

The invention is directed to increasing interoperability between web-based applications and hardware functions of a mobile device. The invention includes a thick-client hardware compatibility wrapper (HCW), which renders web-based applications and manages communication between hardware functionality and the web-based application. Specifically, the HCW monitors the web-based application and identifies commands to the hardware components of the mobile device. These commands are interpreted by the HCW, which then uses native calls to perform the hardware-specific activities. The HCW is also capable of calling functions on a webpage within the web-based application in response to query commands to the web-based application or in response to hardware events from the hardware components.

20 Claims, 6 Drawing Sheets

Related U.S. Application Data continuation of application No. 13/396,128, filed on Feb. 14, 2012, now Pat. No. 9,092,540.

(58) Field of Classification Search
USPC .......................................................... 709/203
See application file for complete search history.

(56) References Cited

U.S. PATENT DOCUMENTS

| | | | |
|---|---|---|---|
| 6,941,344 B2* | 9/2005 | Prell | G06F 9/5061 370/260 |
| 7,111,056 B1 | 9/2006 | Ramey et al. | |
| 7,424,704 B2 | 9/2008 | Orton et al. | |
| 7,472,375 B2 | 12/2008 | Ye et al. | |
| 7,725,605 B2* | 5/2010 | Palmeri | G06F 17/30566 707/781 |
| 7,814,234 B2 | 10/2010 | Hawkins et al. | |
| 7,870,188 B2 | 1/2011 | Mazzitelli et al. | |
| 8,265,918 B1 | 9/2012 | Neema et al. | |
| 8,370,428 B1 | 2/2013 | Bayliss et al. | |
| 8,572,178 B1 | 10/2013 | Frazzini et al. | |
| 8,875,159 B1 | 10/2014 | Nieuwejaar et al. | |
| 9,092,540 B2 | 7/2015 | Hansknecht | |
| 9,329,879 B2 | 5/2016 | Shah et al. | |
| 2004/0003033 A1 | 1/2004 | Kamen et al. | |
| 2004/0024787 A1 | 2/2004 | Edwards et al. | |
| 2004/0073443 A1 | 4/2004 | Gabrick et al. | |
| 2004/0122908 A1* | 6/2004 | Konopka | H04L 29/06 709/208 |
| 2004/0128651 A1 | 7/2004 | Lau | |
| 2004/0226027 A1 | 11/2004 | Winter | |
| 2005/0008003 A1 | 1/2005 | Ramey et al. | |
| 2005/0015781 A1 | 1/2005 | Brown et al. | |
| 2005/0220286 A1 | 10/2005 | Valdez et al. | |
| 2005/0228693 A1 | 10/2005 | Webb et al. | |
| 2006/0173951 A1 | 8/2006 | Arteaga et al. | |
| 2007/0006184 A1 | 1/2007 | Andrews et al. | |
| 2007/0039010 A1* | 2/2007 | Gadre | G06F 8/315 719/328 |
| 2008/0040426 A1 | 2/2008 | Synstelien et al. | |
| 2008/0040490 A1 | 2/2008 | Karlberg | |
| 2008/0104195 A1 | 5/2008 | Hawkins et al. | |
| 2008/0122675 A1 | 5/2008 | Bilodeau et al. | |
| 2008/0184248 A1 | 7/2008 | Barua et al. | |
| 2008/0235708 A1 | 9/2008 | Lopez | |
| 2009/0055836 A1 | 2/2009 | Supalov | |
| 2009/0063502 A1* | 3/2009 | Coimbatore | G06F 17/30893 |
| 2009/0064301 A1* | 3/2009 | Sachdeva | G06F 9/468 726/9 |
| 2009/0172657 A1 | 7/2009 | Makelainen et al. | |
| 2009/0249300 A1 | 10/2009 | Vainer et al. | |
| 2009/0259934 A1* | 10/2009 | Prisament | G06F 17/30893 715/234 |
| 2009/0319529 A1 | 12/2009 | Bartlett et al. | |
| 2010/0013842 A1 | 1/2010 | Green et al. | |
| 2010/0088404 A1 | 4/2010 | Mani et al. | |
| 2010/0155471 A1 | 6/2010 | Heinz et al. | |
| 2010/0192124 A1* | 7/2010 | Hall | G06F 8/30 717/106 |
| 2010/0312821 A1* | 12/2010 | Bannoura | G06F 17/3089 709/203 |
| 2010/0332994 A1* | 12/2010 | Istvan | H04N 5/44543 715/740 |
| 2011/0022552 A1 | 1/2011 | Zimmerman et al. | |
| 2011/0111743 A1 | 5/2011 | Boukai et al. | |
| 2011/0153796 A1* | 6/2011 | Branson | G06F 17/30887 709/223 |
| 2011/0252117 A1 | 10/2011 | Sng et al. | |
| 2011/0302571 A1 | 12/2011 | O'Farrell et al. | |
| 2011/0320715 A1* | 12/2011 | Ickman | G06Q 30/02 711/118 |
| 2011/0321139 A1 | 12/2011 | Jayaraman et al. | |
| 2012/0066487 A1 | 3/2012 | Brown et al. | |
| 2012/0179587 A1 | 7/2012 | Hill et al. | |
| 2012/0188584 A1 | 7/2012 | Sng et al. | |
| 2012/0203592 A1 | 8/2012 | Ravindran | |
| 2012/0278082 A1 | 11/2012 | Borodin et al. | |
| 2012/0317238 A1* | 12/2012 | Beard | H04L 63/10 709/219 |
| 2013/0007575 A1 | 1/2013 | Bacus et al. | |
| 2013/0031462 A1 | 1/2013 | Calvo et al. | |
| 2013/0054533 A1* | 2/2013 | Hao | G06F 17/30 707/649 |
| 2013/0073738 A1 | 3/2013 | Reisman | |
| 2013/0103380 A1* | 4/2013 | Brandstatter | G06F 9/45558 703/26 |
| 2013/0138810 A1 | 5/2013 | Binyamin et al. | |
| 2013/0212146 A1 | 8/2013 | Hansknecht | |
| 2013/0227354 A1* | 8/2013 | Shah | G06F 11/362 714/48 |
| 2013/0275957 A1 | 10/2013 | Villar et al. | |
| 2013/0298007 A1 | 11/2013 | Cullen et al. | |
| 2014/0019638 A1 | 1/2014 | Kurabayashi et al. | |
| 2014/0082117 A1 | 3/2014 | Unhale et al. | |
| 2014/0095589 A1 | 4/2014 | Johnson | |
| 2014/0096081 A1 | 4/2014 | Carpenter et al. | |
| 2014/0304583 A1 | 10/2014 | Fabbri | |
| 2015/0118992 A1 | 4/2015 | Wyatt et al. | |
| 2015/0271269 A1 | 9/2015 | Hansknecht | |

OTHER PUBLICATIONS

Microsoft Computer Dictionary, "wrapper", 5 edition, 2002.*
Lee, K. H. et al., "An Implementation of Mobile Desktop Manager for Mobile Web Devices", Chungnam National University, Korea, Feb. 13-16, 2011, pp. 284-287.
Microsoft Computer Dictionary, Fifth Edition, "wrapper", 2002, p. 575.
Ioannidis et al., "Building a Secure Web Browser", 2001, 8 pages.
Sharma et al., "Automated Evaluation of Search Engine Performance via Implicit User Feedback", SIGIR '05, Aug. 15-19, 2005, Salvador, Brazil, pp. 649-650.
Lehtonen et al., "Towards User-Friendly Mobile Browsing", AAA—Ideal 06, Oct. 10, 2006, Pisa, Italy, 7 pages.
Filho et al., "UML: Unified Modeling Language", 2008, pp. 1183-1212.
Binun et al., "Policy and State based Secure Wrapper and its application to Mobile agents", Proceedings of the First Latin American Web Congress (LA-WEB 2003), Copyright 2003, 13 pages.
Ondrej C. Vostal, USPTO Office Action, U.S. Appl. No. 13/396,128, dated May 22, 2014, 23 pages.
Ondrej C. Vostal, USPTO Office Action, U.S. Appl. No. 13/396,128, dated Sep. 5, 2014, 16 pages.
Ondrej C. Vostal, USPTO Final Office Action, U.S. Appl. No. 13/396,128, dated Dec. 24, 2014, 30 pages.
Ondrej C. Vostal, USPTO Notice of Allowance and Fee(s) Due, U.S. Appl. No. 13/396,128, dated Mar. 20, 2015, 12 pages.
Ondrej C. Vostal, USPTO Office Action, U.S. Appl. No. 14/729,349, dated Aug. 23, 2016, 22 pages.
Ondrej C. Vostal, USPTO Notice of Allowance and Fee(s) Due, U.S. Appl. No. 14/729,349, dated Mar. 20, 2017, 21 pages.
Geoffrey Biggs et al., "Native Robot Software Framework Inter-operation", SIMPAR 2010, pp. 180-191.
Preetham Chandrian, "Efficient Java Native Interface for Android based Mobile Devices", 2011, 70 pages.
S. Martignoni et al., "Call Control in the Mobile Terminal of a Wireless ATM Network", Copyright IEEE 1998, pp. 135-141.
Manuel Palmieri et al., "Comparison of Cross-Platform Mobile Development Tools", Copyright IEEE 2012, pp. 179-186.
Adam Barth et al., "Attacks on JavaScript Mashup Communication", 2009, 8 pages.
Judith Bishop et al., "Experience in integrating Java with C# and .NET", Copyright 2005 John Wiley & Sons, Ltd., 18 pages.
Crenna, "Professional Twitter Development: With Examples in .NET 3.5", 2009, 6 pages.
Crowley et al., "Chapter 3 Enriching Web Applications with AJAX and JSON", 2010, pp. 55-99.

(56) References Cited

OTHER PUBLICATIONS

Jeffrey D. Stewart, "An XML-based knowledge management system of port information for U.S. Coast Guard Cutters", 2003, 124 pages.
McIntyre et al., "Pro PHP Programming", 2011, 432 pages.
Dominic Lovell, "Collaborative Coding in the Cloud", 2009, 130 pages.

\* cited by examiner

INCREASED INTEROPERABILITY BETWEEN WEB-BASED APPLICATIONS AND HARDWARE FUNCTIONS

RELATED APPLICATIONS

The present patent document is a continuation of U.S. patent application Ser. No. 14/729,349, filed Jun. 3, 2015, which is a continuation of U.S. patent application Ser. No. 13/396,128, filed Feb. 14, 2012, now U.S. Pat. No. 9,092,540, issued Jul. 28, 2015. The entire contents of each of such applications are incorporated herein by reference.

FIELD OF THE INVENTION

This invention relates generally to mobile enterprise application platforms (MEAPs), and more specifically, to cross-platform interoperability between web-based applications and hardware functions of a mobile device.

BACKGROUND OF THE INVENTION

Mobile applications are becoming more prevalent as the proliferation of sophisticated mobile devices increases. Mobile devices (e.g., smart phones, cellular phones, smart TV's, portable media players, tablets, etc.) are typically implemented on their own operating systems and do not provide compatibility of application services. Embedded systems such as mobile devices can have dependencies or constraints on hardware resources unlike personal computers and/or web-based applications. This is problematic, as many companies wish to develop one solution that can operate across multiple platforms without having to write specific code for each device. Web applications (e.g., MEAPs) are one way to fill this role as they allow companies to utilize existing infrastructure including development staff, servers, training resources, and the like. MEAPs reduce the development effort by using one tool set and code base to support multiple platforms, provide pre-built interfaces and templates for small form-factor devices, and reduce the amount of transport and network layer software needed to handle mobile traffic. However, with mobile devices, the application often needs to access hardware-specific functionality, such as bar code scanners, cameras, radios, magnetic stripe readers, and the like. Web-based applications, including MEAPs, do not easily interface with this hardware-based functionality.

SUMMARY OF THE INVENTION

In general, embodiments of the invention provide an approach for increased interoperability between web-based applications and hardware functions of a mobile device. Embodiments include a thick-client hardware compatibility wrapper (HCW) to render web-based applications and manage communication between hardware functionality and the web-based application. Specifically, the HCW monitors the web-based application and identifies commands to the hardware components of the mobile device. These commands are interpreted by the HCW, which then uses native calls to perform the hardware-specific activities. The HCW is also capable of calling functions on a webpage within the web-based application in response to query commands to the web-based application or in response to hardware events.

One aspect of the present invention includes a method for increased interoperability between web-based applications and hardware functions of a mobile device, comprising the computer implemented steps of: receiving a web-based application at a hardware compatibility wrapper (HCW) of a mobile device; monitoring for a request between a hardware component of the mobile device and the web-based application; and calling an execution request to one of the hardware component and the web-based application based on the request.

Another aspect of the present invention provides a system for increased interoperability between web-based applications and hardware functions of a mobile device, comprising: a memory medium comprising instructions; a bus coupled to the memory medium; and a processor coupled to the bus that when executing the instructions causes the system to: receive a web-based application at a hardware compatibility wrapper (HCW) of a mobile device; monitor for a request between a hardware component of the mobile device and the web-based application; and call an execution request to one of the hardware component and the web-based application based on the request.

Another aspect of the present invention provides a computer-readable storage device storing computer instructions, which when executed, enables a computer system to provide interoperability between web-based applications and hardware functions of a mobile device, the computer instructions comprising: receiving a web-based application at a hardware compatibility wrapper (HCW) of a mobile device; monitoring for a request between a hardware component of the mobile device and the web-based application; and calling an execution request to one of the hardware component and the web-based application based on the request.

Another aspect of the present invention provides a computer implemented method for increased interoperability between web-based applications and hardware functions of a mobile device, comprising: providing a computer infrastructure being operable to: receive a web-based application at a hardware compatibility wrapper (HCW) of a mobile device; monitor for a request between a hardware component of the mobile device and the web-based application; and call an execution request to one of the hardware component and the web-based application based on the request.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments now will be described more fully herein with reference to the accompanying drawings, in which exemplary embodiments are shown. Embodiments of the invention provide increased interoperability between web-based applications and hardware functions of a mobile device, the approach including a thick-client hardware compatibility wrapper (HCW) to render web-based applications and manage communication between hardware functionality and the web-based application. Specifically, the HCW monitors the web-based application and identifies commands to the hardware components of the mobile device. These commands are interpreted by the HCW, which then uses native API calls to perform the hardware-specific activities. The HCW is also capable of calling functions on a webpage within the web-based application in response to query commands to the web-based application or in response to hardware events from the hardware components.

This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," or similar language means that a particular feature, structure, or characteristic described in connection with the embodiment is included in at least one embodiment of the present invention. Thus appearances of the phrases "in one embodiment," "in an embodiment," "in embodiments" and similar language throughout this specification may, but do not necessarily, all refer to the same embodiment.

Figure 1:
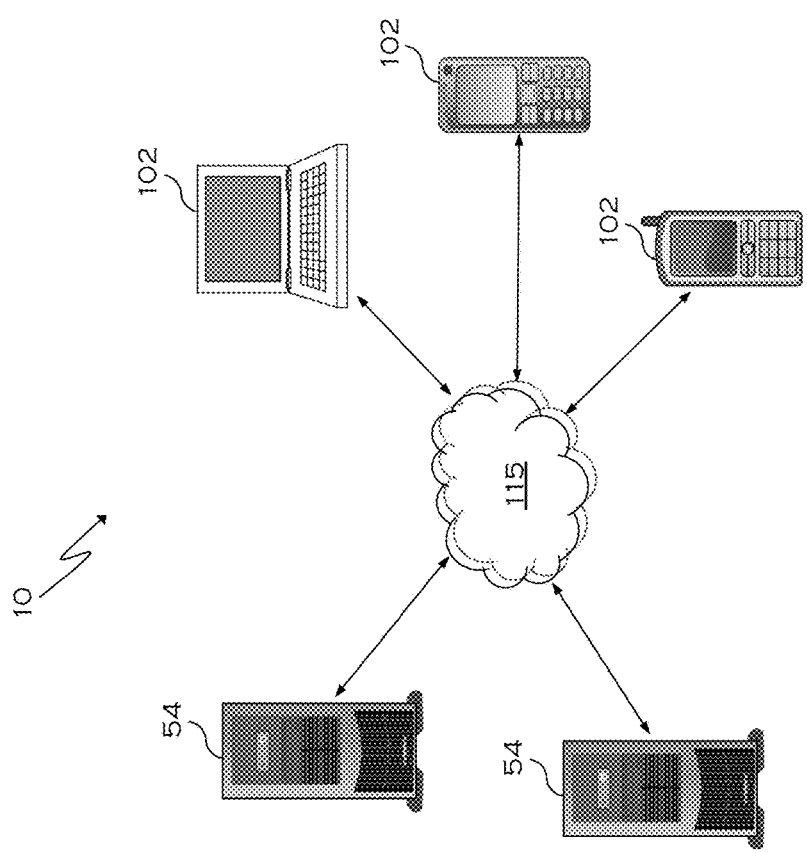
FIG. 1 shows a pictorial representation of a network of data processing systems in which aspects of the illustrative embodiments may be implemented.

With reference now to the figures, FIG. 1 depicts a pictorial representation of a network of data processing system 10 in which aspects of the illustrative embodiments may be implemented. Network data processing system 10 is a network of computers (e.g., mobile devices) in which embodiments may be implemented. Network data processing system 10 contains network 115, which is the medium used to provide communications links between various mobile devices, servers, and computers connected together within network data processing system 10. Network 115 may include connections, such as wire, wireless communication links, or fiber optic cables.

In the depicted example, servers 54 and a set of mobile devices 102 connect to network 115. These mobile devices may be, for example, personal computers (e.g., laptop computers and tablet computers), mobile telephones, personal digital assistants (PDAs), and the like. In the depicted example, servers 54 provide data, such as boot files, operating system images, and applications to mobile devices 102. Mobile devices 102 are clients to servers 54 in this example. Network data processing system 10 may include additional servers, clients, and other devices not shown.

In the exemplary embodiment, network data processing system 10 is the Internet with network 115 representing a worldwide collection of networks and gateways that use the Transmission Control Protocol/Internet Protocol (TCP/IP) suite of protocols to communicate with one another. At the heart of the Internet is a system of high-speed data communication lines between major nodes or host computers, consisting of thousands of commercial, governmental, educational and other computer systems that route data and messages. Of course, network data processing system 10 also may be implemented as a number of different types of networks, such as for example, an intranet, a local area network (LAN), or a wide area network (WAN). Network data processing system 10 represents one environment in which one or more web-based applications operate with mobile devices 102, as will be described in further detail below. It will be appreciated that FIG. 1 is intended as an example, and not as an architectural limitation for different embodiments.

Figure 2:
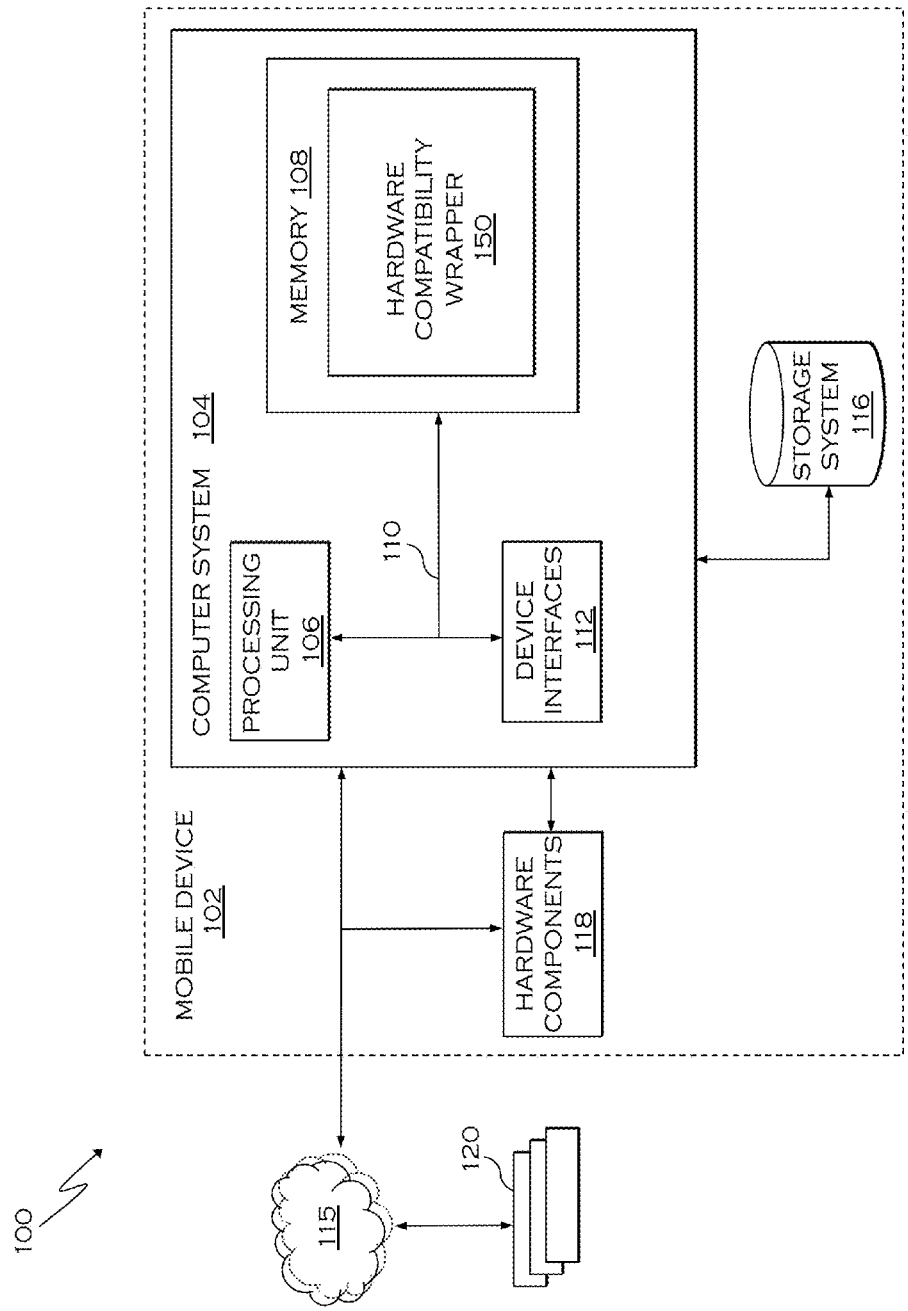
FIG. 2 shows a schematic of an exemplary computing environment in which elements of the present invention may operate.

Turning now to FIG. 2, a computerized implementation 100 of the present invention will be described in greater detail. As depicted, implementation 100 includes computer system 104 deployed within a mobile device 102 (e.g., computer infrastructure). This is intended to demonstrate, among other things, that the present invention could be implemented within network environment 115 (e.g., the Internet, a wide area network (WAN), a local area network (LAN), a virtual private network (VPN), etc.), or on a stand-alone computer system. Still yet, the computer infrastructure of mobile device 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for providing increased interoperability between web-based applications and hardware functions of a mobile device. It should be understood that any other computers implemented under the present invention may have different components/software, but will perform similar functions. As shown, computer system 104 includes a processing unit 106 capable of operating with a hardware compatibility wrapper (HCW) 150 stored in a memory unit 108 to provide increased interoperability between hardware functions and web-based applications, as will be described in further detail below. Also shown is a bus 110, and device interfaces 112.

Processing unit 106 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 106 collects and routes data from a set of applications 120 (e.g., web-based applications) to HCW 150, as well as from device components 118. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating HCW 150, which is stored in memory 108 and/or storage system 116. While executing computer program code, processing unit 106 can read and/or write data to/from memory 108 and storage system 116. Storage system 116 can include VCRs, DVRs, RAID arrays, USB hard drives, optical disk recorders, flash storage devices, and/or any other data processing and storage elements for storing and/or processing data. Although not shown, computer system 104 could also include I/O interfaces that communicate with one or more hardware device components 118 of mobile device 102 that enable a user to interact with computer system 104 (e.g., a keyboard, a display, camera, etc.).

Figure 3:
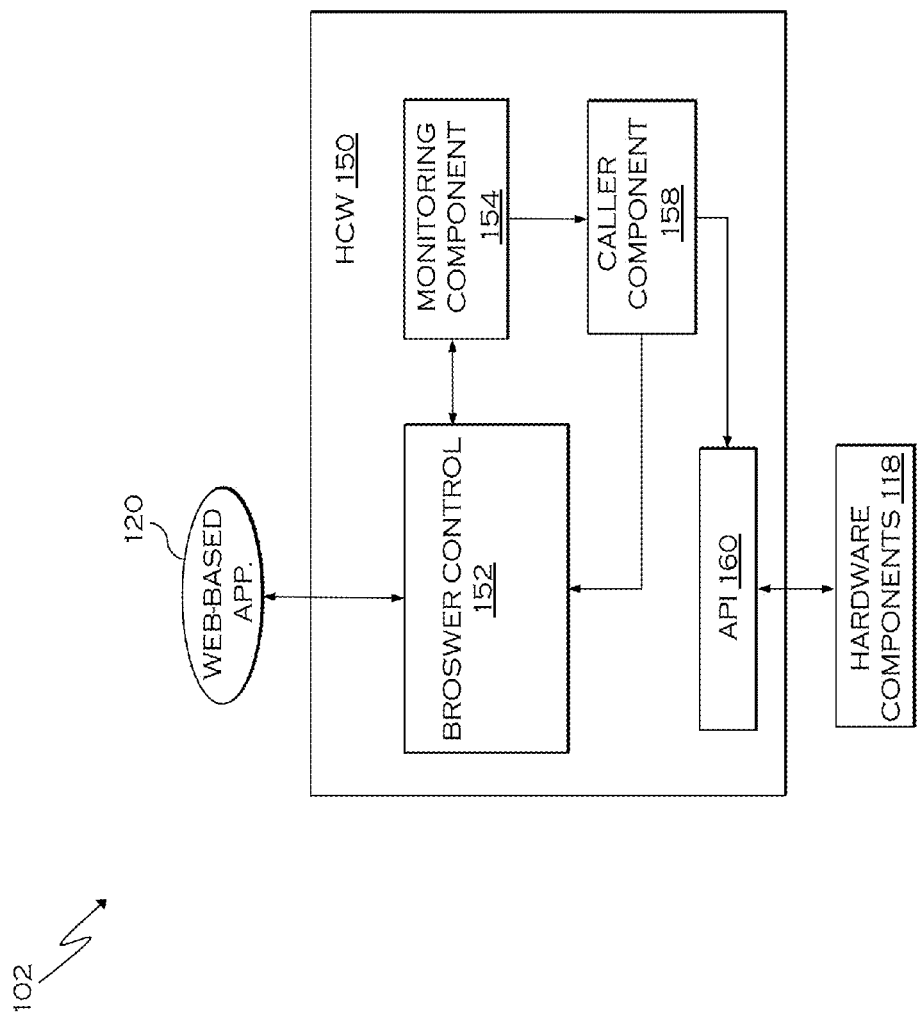
FIG. 3 shows a mobile device that operates in the environment shown in FIG. 1.

Turning now to FIG. 3, the structure and operation of mobile device 102 according to embodiments of the invention will be described in greater detail. HCW 150 increases cross-platform interoperability between web-based applications and hardware components of mobile device 102 by providing solutions that can be changed on the server without having to re-deploy web applications on mobile device 102. To accomplish this, embodiments of the invention use HCW 150 to render web-based application 120 and manage its communication with hardware components 118 of mobile device 102. Web-based application 120 is received at HCW 150, which may be a thick-client wrapper (e.g., software code, program module(s), application program(s), etc.) running natively on mobile device 102. Depending on the platform/device, HCW 150 could be developed in C# .NET or Visual Basic (VB).net for Windows® mobile devices, Objective C for iOS devices, and Java® for Android™ devices. (Visual Basic® and WINDOWS® are registered trademarks of Microsoft Corporation, Objective C is a registered trademark of Apple Computer, Inc., JavaScript® is a registered trademark of ORACLE AMERICA, INC., and Android™ is a registered trademark of the Google Corporation). HCW 150 operates with a browser control 152, which enables mobile phone users to, among other things, browse the World Wide Web.

As further shown, HCW 150 comprises a monitoring component 154 that monitors for a request originating from hardware components 118 and web-based application 120. Based on the request, caller component 156 calls an execution request (e.g., a command or function) to either hardware component 118 or a web-based application 120 to execute the request, e.g., turn on a barcode scanner, change the device volume, or execute a function.

In one embodiment, the execution request comprises a command from web-based application 120 to hardware components 118. In this case, HCW 150 monitors activity within browser control 152 for commands and/or parameters sent by a webpage 158 (e.g., via JavaScript®) or in response to a user-initiated click, button, selection, etc. Specifically, a monitoring component 154 is configured to monitor a uniform resource locator (URL) of webpage 158 within browser control 152, and parse the URL for hash tags that are used to indicate commands to one or more hardware components 118. That is, the URL string is broken down into its component parts: scheme, host, port, path, and query string, wherein the hash tags are used to separate the commands. These commands are extracted and analyzed at HCW 150, which then uses native API calls from an API 160 to perform the hardware-specific function(s). As used herein, API 160 may refer to computer code that supports application access to operating system functionality. API 160 uses device specific libraries or native code allowing access to mobile device 102, including hardware components 118, at a low level.

The execution request may also comprise a function called on webpage 158 of browser control 152. In this embodiment, HCW 150 is capable of communicating with webpage 158 hosted in browser control 152 by calling a function (e.g., JavaScript®) on the page. Monitoring component 154 is configured to monitor for a hardware event from hardware components 118, such as a barcode scan initiated by a user via a scanner, or a GPS location change event. Monitoring component 154 also monitors for a query command to browser control 152, such as a query to webpage 158. Caller component 156 is then configured to call a function on webpage 158 of browser control 152 in response to the hardware event from hardware component 118 or the query command to webpage 158 of browser control 152.

Furthermore, HCW 150 is not limited to a uni-directional command/function request. Instead, HCW 150 is capable of intelligent handling of a series of requests configured in a request/response communication format. For instance, the browser may indicate (e.g., via a hash tag) a request for a current GPS location. HCW 150 recognizes the command request and may query a hardware GPS device for the current location. Based on this, HCW 150 may then call a JavaScript® function to browser control 152, passing the function the current GPS coordinates.

Figure 4:
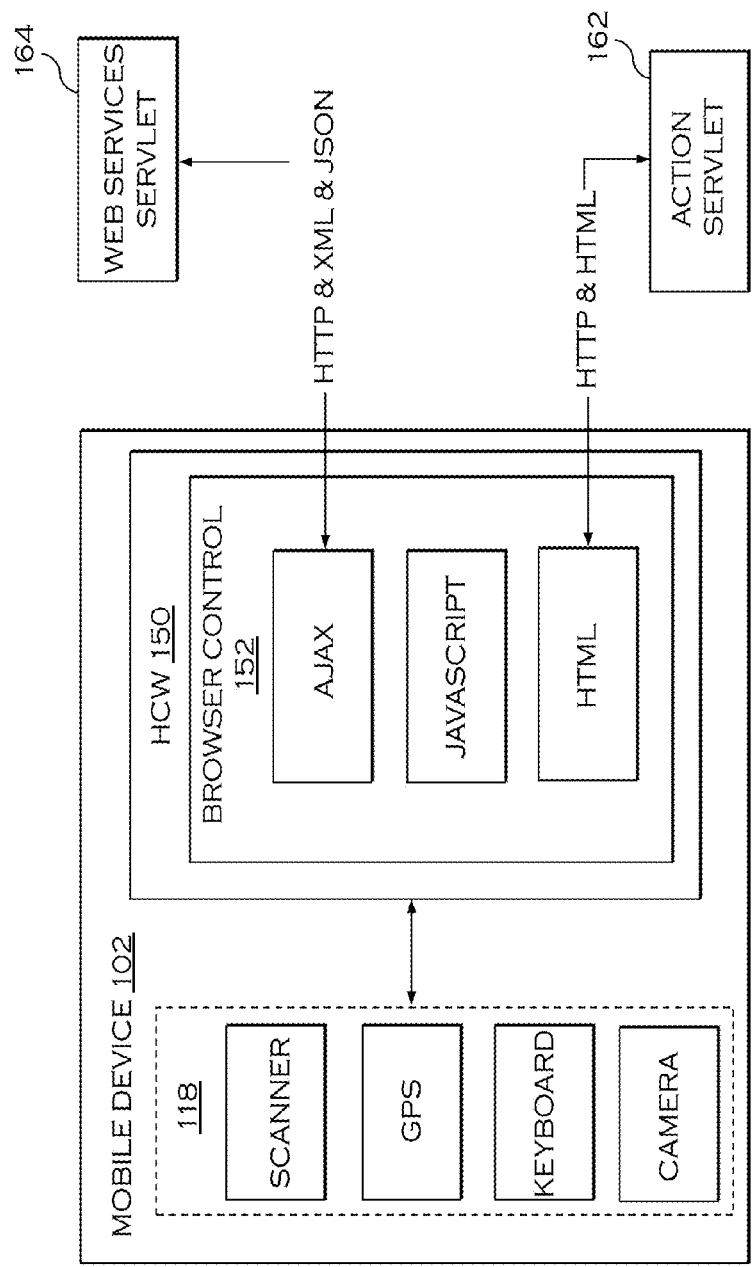
FIG. 4 shows a system for increased interoperability between web-based applications and hardware functions of a mobile device.

Turning to FIG. 4, the structure and operation of mobile device 102 according to embodiments of the invention will be described in greater detail. As shown, HCW 150 and browser control 152 operate together to render web applications and manage its communication with hardware components 118 (e.g., scanner, GPS, keyboard, camera, etc.) In general, browser control 152 is a browser embedded into an application to enable users to view Web content from within that application. HCW 150 controls browser control 152, and determines, e.g., the way the browser control 152 displays web pages, dialogs, softkeys, scroll bars, and so on. Browser control 152 allows, among other things, browsing, document viewing, and data downloading capabilities of the web-based application. Web applications using browser control 152 enable the user to browse sites on the Internet, as well as folders/files/components stored locally on mobile device 102. Browser control 152 supports Web browsing through both point-and-click hyper linking and URL navigation. Additionally, browser control 152 maintains a history list that allows the user to browse forward and backward through previously browsed sites, folders, documents, and so on.

As shown, browser control 152 enables web pages to be implemented in Hypertext Markup Language (HTML), JavaScript®, Asynchronous JavaScript® and XML (AJAX), Extended Hypertext Markup Language (XHTML), Wireless Markup Language (WML), and so on. Browser control 152 enables display of XHTML, HTML, WML, CSS, or scripted content inside an application. In an exemplary embodiment, browser control 152 operates with an action servlet 162 (e.g., a web standard Struts/Struts II for building front ends to Java® applications) to serve up more sophisticated web pages. During operation, action servlet 162 receives an HTTP request, uses the Struts configuration files to determine the appropriate application module, and routes the request to the module's request processor. Action servlet 162 is also responsible for initialization and clean-up of resources.

Browser control 152 further operates with a web services servlet 164 used by JavaScript® on the pages for real-time activities. In one embodiment, an AJAX development approach may be implemented on the client-side for asynchronous web applications. AJAX allows web pages to be updated asynchronously (i.e., behind the scenes) by exchanging small amounts of data with the server to update parts of a web page, as opposed to reloading the whole page. For example, a webpage in which a user selects Ohio in a state dropdown causes the JavaScript® to use web services servlet 164 to look up all the cities in Ohio and populate a city dropdown. In another example, a bar code scan by the scanner causes the JavaScript® to upload bar code data via web services servlet 164 rather than submitting a form each time. AJAX is based on Internet standards, and is browser and platform-independent. AJAX uses a combination of XMLHttpRequest object (e.g., to exchange data asynchronously with a server) JavaScript/DOM (e.g., to display/interact with the information) CSS (e.g., to style the data) and XML (e.g., as the format for transferring data). It will be appreciated that the use of AJAX in this embodiment is intended as exemplary, and not as a limitation for different embodiments.

Furthermore, during use, HCW 150 monitors browser control 152 and accepts commands to manage mobile device hardware components 118 of mobile phone 102. As discussed above, with mobile device 102, the web-based application may need to access hardware specific functionality, such as bar code scanners, GPS devices, keyboards, cameras, radios, magnetic stripe readers, native volume components, and the like. HCW 150 monitors the browser and accepts commands to mange hardware components 118, e.g., by natively turning up the volume, beeping, turning on a barcode scanner, etc. HCW 150 is also capable of calling functions on a web-based application in response to query commands to the web-based application or in response to hardware events via hardware components 118.

As implemented, embodiments of the invention provide increased interoperability between web-based applications and mobile hardware components of a mobile device by offering solutions that can be modified on the server without having to re-deploy the application to the mobile device. Once the HCW has been installed on a device, no further local installation is necessary. Therefore, when a new device becomes available, a new version of the HCW can be produced for that device, allowing the existing enterprise application to run on the new device without modification. Additionally, the invention allows organizations having significant infrastructure in place for the design, development, and management of Web 2.0 applications to extend their reach to mobile platforms without a considerable amount of custom mobile application development by allowing the web solution to run on any device for which an HCW has been designed.

It can be appreciated that the approaches disclosed herein can be used within a computer system to provide interoperability between hardware functions and web-based applications, as shown in FIG. 2. In this case, HCW 150 can be provided, and one or more systems for performing the processes described in the invention can be obtained and deployed to mobile device 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 5:
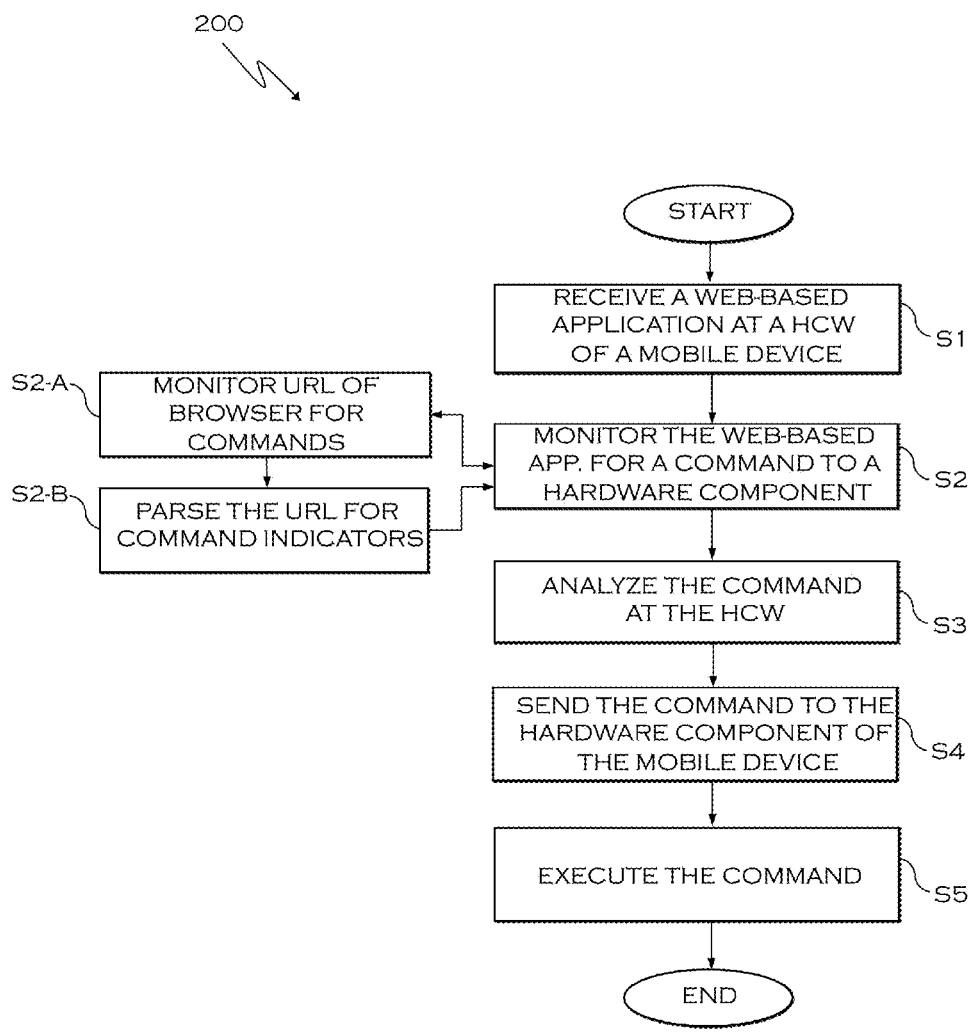
FIG. 5 shows a flow diagram of an approach for providing interoperability between web-based applications and hardware functions of a mobile device according to embodiments of the invention.

Computer system 104 carries out the methodologies disclosed herein, as shown in FIG. 5. Shown is a method 200 for providing interoperability between hardware functions and web-based applications, wherein communication is received from the web-based application at the HCW to perform a native hardware function within the mobile device. To accomplish this, at S1, a web-based application is received at the HCW of the mobile device. At S2, the web-based application is monitored for a command to a hardware component of the mobile device. Specifically, at S2-A, the URL of a browser is monitored for commands to hardware functions by parsing the URL for hash tags at S2-B. Next, at S3, the command(s) is extracted and analyzed, and sent to the desired hardware component of the mobile device at S4. Finally, at S5, the hardware-function command is executed and the process ends.

Figure 6:
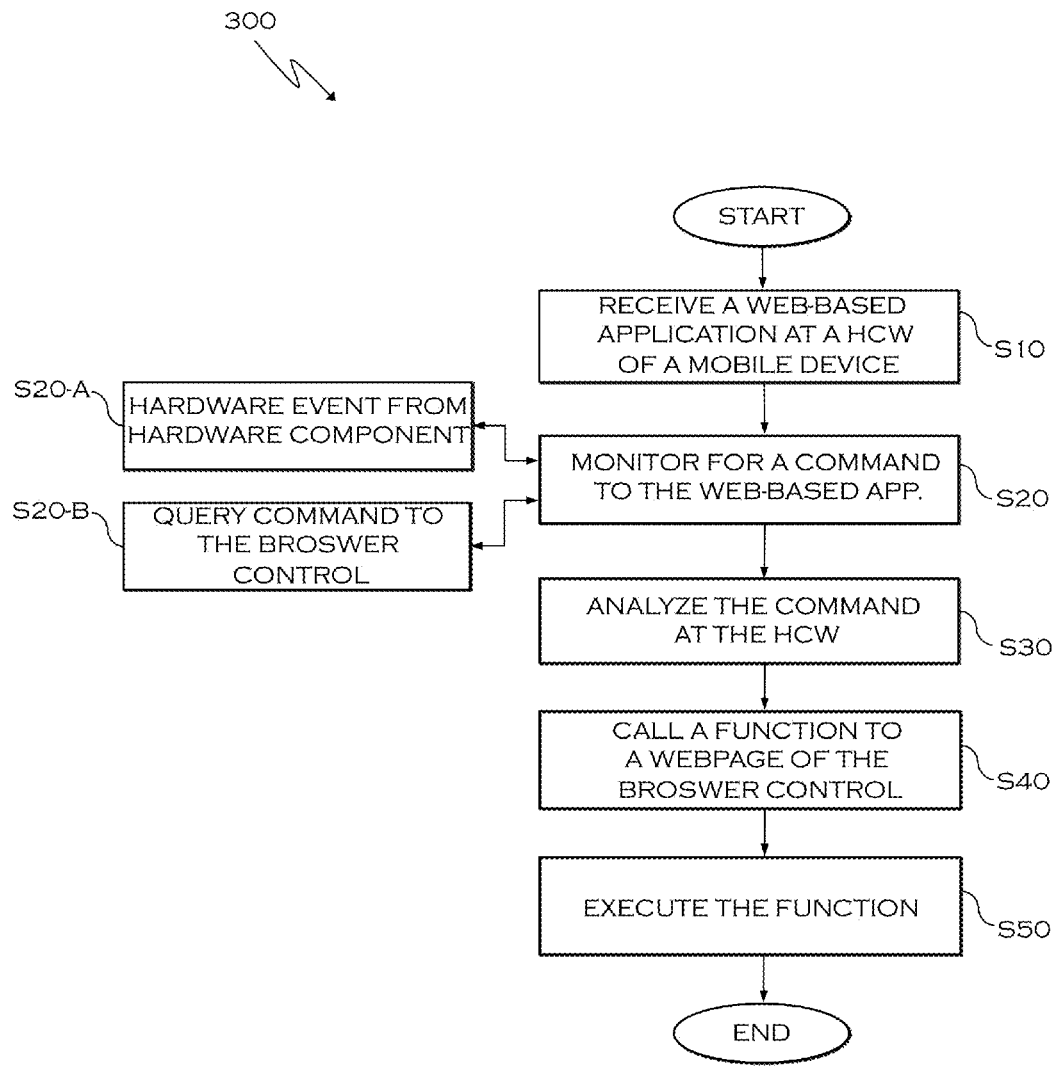
FIG. 6 shows a flow diagram of another approach for providing interoperability between web-based applications and hardware functions of a mobile device according to embodiments of the invention.

Turning now to FIG. 6, a method 300 is shown for providing interoperability between hardware functions and web-based applications, wherein communication flows from the HCW to the web-based application to call a function to the browser control. At S10, a web-based application is received at the HCW of the mobile device. At S20, the HCW is monitored for a command to the web-based application. Specifically, at S20-A, HCW is monitored for a hardware event from one or more hardware components. At S20-B, a query command to a webpage within the browser control is monitored for. Next, at S30, the command(s) is extracted and analyzed, and one or more functions are called to the browser control at S40. Finally, at S50, the function is executed and the process ends.

The flowcharts of FIGS. 5 and 6 illustrate the architecture, functionality, and operation of possible implementations of systems, methods and computer program products according to various embodiments of the present invention. In this regard, each block in the flowcharts may represent a module, segment, or portion of code, which comprises one or more executable instructions for implementing the specified logical function(s). It should also be noted that, in some alternative implementations, the functions noted in the blocks might occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, as will be described herein, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

For example, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

"Computer-readable storage device" includes volatile and non-volatile, removable and non-removable computer storable media implemented in any method or technology for storage of information such as computer readable instructions, data structures, program modules, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided an approach for providing interoperability between hardware functions and web-based applications. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for increased interoperability between a web-based application and hardware functions of a mobile device, comprising the computer implemented steps of:
   receiving the web-based application at a hardware compatibility wrapper (HCW) of the mobile device;
   monitoring communications, by the HCW, for a command request between a hardware component local to the mobile device and the web-based application, the monitoring comprising:
   receiving the command request from a webpage;
   parsing a uniform resource locator (URL) of the webpage within a browser control of the web-based application by breaking the URL down into component parts;
   separating the component parts by hashtags; and identifying a set of command indicators to the hardware component based on the parsing and the separating; and calling an execution request to the hardware component based on the command request and the identified set of command indicators;

wherein the hardware component local to the mobile device is at least one of a bar code scanner, a GPS device, a camera, a radio, a magnetic stripe reader, or a native volume component.

2. The method according to claim 1, wherein the execution request is to change a power setting of a barcode scanner.

3. The method according to claim 1, wherein the execution request is to change a volume setting of a device.

4. The method according to claim 1, wherein the hardware component is a camera.

5. The method according to claim 1, wherein the hardware component is a GPS device.

6. The method according to claim 1, further comprising operating the HCW natively on the mobile device as a thick-client.

7. The method according to claim 1, wherein the monitoring and the calling are performed by the HOW.

8. The method of claim 1, wherein a solution service provider provides a computer infrastructure operable to perform the method for one or more consumers.

9. A system for increased interoperability between a web-based application and hardware functions of a mobile device, comprising:
a memory medium comprising instructions;
a bus coupled to the memory medium; and
a processor coupled to the bus that when executing the instructions causes the system to:
receive the web-based application at a hardware compatibility wrapper (HCW) of the mobile device;
monitor communications, by the HCW, for a command request between a hardware component local to the mobile device and the web-based application, the monitoring comprising:
receiving the command request from a webpage;
parsing a uniform resource locator (URL) of the webpage within a browser control of the web-based application by breaking the URL down into component parts;
separate the component parts by hashtags; and
identify a set of command indicators to the hardware component based on the parsing and the separating; and
call an execution request to the hardware component based on the command request and the identified set of command indicators;
wherein the hardware component local to the mobile device is at least one of a bar code scanner, a GPS device, a camera, a radio, a magnetic stripe reader, or a native volume component.

10. The system according to claim 9, wherein the execution request is to change a power setting of a barcode scanner.

11. The system according to claim 9, wherein the execution request is to change a volume setting of a device.

12. The system according to claim 9, further comprising operating the HCW natively on the mobile device as a thick-client.

13. The system according to claim 9, wherein the monitoring and calling are performed by the HOW.

14. The system according to claim 9, wherein the hardware component is a camera or a GPS device.

15. A computer-readable storage device storing computer instructions, which when executed, enables a computer system to provide interoperability between a web-based application and hardware functions of a mobile device, the computer instructions comprising:
receiving the web-based application at a hardware compatibility wrapper (HCW) of the mobile device;
monitoring communications, by the HCW, for a command request between a hardware component local to the mobile device and the web-based application, the monitoring comprising:
receiving the command request from a webpage;
parsing a uniform resource locator (URL) of the webpage within a browser control of the web-based application by breaking the URL down into component parts;
separating the component parts by hashtags; and
identifying a set of command indicators to the hardware component based on the parsing and the separating; and
calling an execution request to the hardware component based on the command request and the identified set of command indicators;
wherein the hardware component local to the mobile device is at least one of a bar code scanner, a GPS device, a camera, a radio, a magnetic stripe reader, or a native volume component.

16. The computer-readable storage device according to claim 15, wherein the execution request is to change a power setting of a barcode scanner.

17. The computer-readable storage device according to claim 15, wherein the execution request is to change a volume setting of a device.

18. The computer-readable storage device according to claim 15, further comprising operating the HCW natively on the mobile device as a thick-client.

19. The computer-readable storage device according to claim 15, wherein the monitoring and calling are performed by the HOW.

20. The computer-readable storage device according to claim 15, wherein the hardware component is a camera or a GPS device.

* * * * *